United States Patent
Rollins et al.

(10) Patent No.: US 10,855,522 B2
(45) Date of Patent: Dec. 1, 2020

(54) DUAL PORT STORAGE DEVICE EMULATION

(71) Applicant: NetApp Inc., Sunnyvale, CA (US)

(72) Inventors: William Leo Rollins, Cheswick, PA (US); Daniel John Kolor, Cranberry Township, PA (US)

(73) Assignee: NetApp Inc., Sunnyvale, CA (US)

( * ) Notice: Subject to any disclaimer, the term of this patent is extended or adjusted under 35 U.S.C. 154(b) by 65 days.

(21) Appl. No.: 16/190,705

(22) Filed: Nov. 14, 2018

(65) Prior Publication Data
US 2020/0052955 A1    Feb. 13, 2020

Related U.S. Application Data

(60) Provisional application No. 62/718,026, filed on Aug. 13, 2018.

(51) Int. Cl.
*H04L 12/24* (2006.01)
*H04L 12/935* (2013.01)
*H04L 12/931* (2013.01)

(52) U.S. Cl.
CPC ...... *H04L 41/0672* (2013.01); *H04L 49/3045* (2013.01); *H04L 49/70* (2013.01); *H04L 41/0654* (2013.01)

(58) Field of Classification Search
CPC ....... G06F 9/45558; G06F 2009/45595; G06F 2009/4557; G06F 9/45533; H04L 45/586; H04L 12/4641; H04L 41/0654; H04L 41/0672; H04L 49/3045; H04L 49/70
See application file for complete search history.

(56) References Cited

U.S. PATENT DOCUMENTS

| | | |
|---|---|---|
| 7,051,182 B2 | 5/2006 | Blumenau et al. |
| 7,620,794 B2 | 11/2009 | Sakaki et al. |
| 7,962,647 B2 | 6/2011 | Suri et al. |
| 7,984,123 B2 | 7/2011 | Tripathi et al. |
| 8,082,466 B2 | 12/2011 | Tanaka et al. |
| 8,407,391 B2 | 3/2013 | Uehara et al. |
| 8,572,352 B2 | 10/2013 | Honda et al. |
| 8,677,024 B2 | 3/2014 | Baratakke et al. |
| 9,558,082 B2 | 1/2017 | Antony et al. |
| 9,680,772 B2 | 6/2017 | Kothari et al. |
| 9,690,683 B2 | 6/2017 | Skerry et al. |
| 9,819,551 B2 | 11/2017 | Forster et al. |

(Continued)

*Primary Examiner* — Jae Y Lee
*Assistant Examiner* — Aixa A Guadalupe Cruz
(74) *Attorney, Agent, or Firm* — Cooper Legal Group, LLC

(57) ABSTRACT

Techniques are provided for dual port storage device emulation. A switch is configured with a first virtual switch to provide a first computing device with access a first single port device through a first port and a second port. The switch is configured with a second virtual switch to provide a second computing device with access to a second single port device through a third port and a fourth port. In response to determining that the first computing device has experienced a failure, the first virtual switch and the second virtual switch are reconfigured to provide the second computing device with access to the first single port device through the second port and access to the second single port device through the fourth port. The first computing device is disconnected from accessing the first single port device through the first virtual switch.

20 Claims, 7 Drawing Sheets

(56) References Cited

U.S. PATENT DOCUMENTS

| | | | |
|---|---|---|---|
| 10,402,361 B2* | 9/2019 | Tanaka | G06F 13/4221 |
| 2015/0277951 A1 | 10/2015 | Sundararaman et al. | |
| 2015/0355982 A1* | 12/2015 | Ganesan | G06F 11/2028 |
| | | | 714/4.11 |

* cited by examiner

DUAL PORT STORAGE DEVICE EMULATION

RELATED APPLICATIONS

This application claims priority to U.S. Provisional Patent Application, titled "DUAL PORT STORAGE DEVICE EMULATION", filed on Aug. 13, 2018 and accorded U.S. application Ser. No.: 62/718,026, which is incorporated herein by reference.

BACKGROUND

Many storage systems store data within storage devices. Single port storage devices have a single port for connectivity. A computing device can be connected to a single port storage device through the single port, such as by connecting a communication wire from a port on the computing device to the single port of the single port storage device. In this way, the computing device can access the single port storage device through the single port, such as to write and read data to and from the single port storage device. However, because the single port storage device merely has a single port for connectivity, a second computing device cannot be simultaneously connected to the single port storage device while the computing device is connected to the single port storage device. This is because the computing device will have to be physically disconnected from the single port so that the second computing device can be physically connected to the now available single port. Having to manually disconnect and connect computing devices to a single port storage device (e.g., in response to the computing device failing) is cumbersome, time consuming, and results in high client latency and long failover times to failover from the computing device to the second computing device. Such high client latency and long failover times are unacceptable to client devices, and can violate storage accessibility and availability requirements imposed upon a storage computing environment comprising the computing device and the second computing devices.

DETAILED DESCRIPTION

Figure 1:
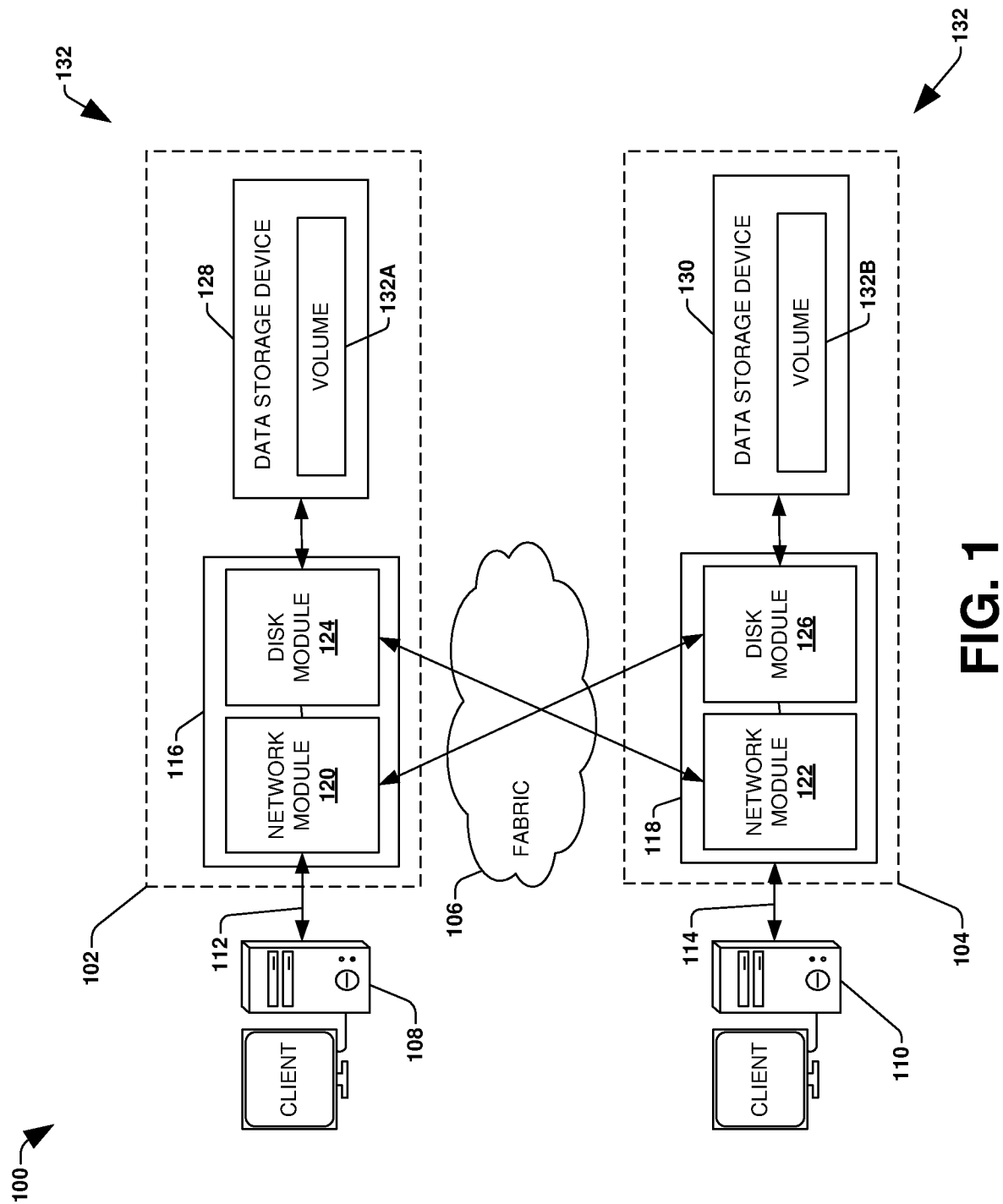
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Many storage systems require dual port storage devices in order to provide redundancy (e.g., two computing devices/nodes have simultaneous access to the same dual port storage device), high availability failover (e.g., if a computing device connected to the dual port storage device fails, then a second computing device connected to the dual port storage device can provide clients with access to data within the dual port storage device), and full performance. This is because dual port storage devices have two ports, and thus provide 2 paths for computing devices to access data within a dual port storage device. In this way, a first computing device can be connected to a first port of the dual port storage device and a second computing device can be connected to a second port of the dual port storage device. Thus, if the first computing device fails and is no longer able to provide clients with access to data within the dual port storage device, then the second computing device can provide failover access for clients to the data within the dual port storage device using the second port.

One issue with dual port storage devices is that dual port storage devices are prohibitively expensive, and are not available for certain types of storage situations that otherwise reply upon lower cost storage. Unfortunately, if lower cost single port storage devices are used instead, then a storage system is unable to provide adequate failover, redundancy, and high availability to the data within the single port storage devices. This is because only a single computing device can be connected to the only port of a single port storage device at any given point in time. Thus, if that computing device fails, then no other computing device will have access or connectivity to the single port storage device. Instead, manual intervention is required where a user will have to physically disconnect the computing device from the port of the single port storage device so that a second computing device can be connected to the port. The user must then configure the second computing device to provide client devices with access to the single port storage device through the port. Such manual intervention is cumbersome and time consuming, which increases the downtime where clients are unable to access data within the single port storage device until the second computing device is connected to the port and configured to access the single port storage device through the port. Furthermore, full performance cannot be achieved because merely a single port can be used for data transfer instead of two ports.

These technical problems rooted in computer technology are solved by this computer implemented technique for utilizing multiple virtual switches within a switch, such as a four port switch, to emulate a dual port storage device using two single port storage devices. This benefits storage systems and client devices because lower cost single port storage devices can be used within storage systems to provide similar levels of redundancy and performance otherwise achieved using more expensive dual port storage devices. This computer implemented technique configures the switch with a first virtual switch to provide a first computing device with access to a first single port storage device. This access is provided through a first port connected to the first computing device and a second port connected to the first single port storage device. The switch is configured with a second virtual switch to provide a second computing device with access to a second single port storage device. This access is provided through a third port connected to the second computing device and a fourth port connected to the second single port storage device.

A virtual switch may comprise executable code that is executed by the switch to perform packet routing and forwarding between certain ports of the switch based upon how the virtual switch is configured. For example, the first virtual switch listens for packets on the first port (e.g., read and write operations transmitted by the first computing device to the first port) and forwards those packets to the second port, for transmission to the first single port storage device, based upon the configuration of the first virtual switch. The first virtual switch listens for packets on the second port (e.g., data being read from the first single port storage device or an operation complete message from the first single port storage device that an operation was successfully completed by the first single port storage device) and forwards those packets to the first port, for transmission to the first computing device, based upon the configuration of the first virtual switch. A variety of other configurations can be applied to the first virtual switch so that the first virtual switch listens to select port(s) and forwards packets to other select port(s) (e.g., listens for packets on port 4 and forwards those packets to ports 1, 2, and 3; listens for packets on port 2 and 3 and forwards those packets to port 1; any other configuration of selective ports).

The second virtual switch listens for packets on the third port (e.g., read and write operations transmitted by the second computing device to the third port) and forwards those packets to the fourth port, for transmission to the second single port storage device, based upon the configuration of the second virtual switch. The second virtual switch listens for packets on the fourth port (e.g., data being read from the second single port storage device or an operation complete message from the second single port storage device that an operation was successfully completed by the second single port storage device) and forwards those packets to the third port, for transmission to the second computing device, based upon the configuration of the second virtual switch. A variety of other configurations can be applied to the second virtual switch so that the second virtual switch listens to select port(s) and forwards packets to other select port(s) (e.g., listens for packets on port 1 and forwards those packets to ports 2 and 3; listens for packets on port 2 and forwards those packets to port 1 and 4; or any other configuration of selective ports).

When the first computing device fails (e.g., a loss of a heartbeat communicated through interrupts sent by mailbox registers), clients accessing data of the first single port storage device will be unable to access such data through the first computing device. Accordingly, the second computing device performs a takeover (e.g., a failover operation) to take over ownership of the first single port storage device in order to provide clients with continued access to data within the first single port storage device. This is done by reconfiguring the virtual switches within the switch so that the second computing device can access the first single port storage device.

In particular, the first virtual switch is reconfigured to disconnect the first virtual switch from the second port connected to the first single port storage device. The first virtual switch may be reconfigured to merely be connected to the first port connected to the failed first computing device. Thus, the switch can still receive communication from the first computing device, such as an indication that the first computing device has recovered from the failure. In this way, the first virtual switch will no longer route packets between the first port and the second port, thus disconnecting the failed first computing device from the first single port storage device.

The second virtual switch is reconfigured to connect the second virtual switch to the third port connected to the second computing device, the second port connected to the first single port storage device, and the fourth port connected to the second single port storage device. The second virtual switch is reconfigured to listen for packets on the third port, and forward packets targeting the first single port storage device to the second port for transmission to the first single port storage device and forward packets targeting the second single port storage device to the fourth port for transmission to the second single port storage device. The second virtual switch is reconfigured to listen for packets on the second port from the first single port storage device, and forward those packets to the third port for transmission to the second computing device. The second virtual switch is reconfigured to listen for packets on the fourth port from the second single port storage device, and forward those packets to the third port for transmission to the second computing device.

Once the first virtual switch and the second virtual switch are reconfigured, the second computing device has access to both the first single port storage device and the second single port storage device through the second virtual switch. The second computing device can now provide clients with access ("failover access" in place of the access that would have been provided by the first computing device before the first computing device failed) to the data within the first single port storage device and access (normal access provided by the second computing device during normal operation) to data within the second single port storage device. In an embodiment of taking over ownership of the first single port storage device by the second computing device, the second computing device may reconstruct and rebuild a data queue and administration queue of the first single port storage device. The queues are rebuilt to point to the second computing device so that queued information (e.g., packets, data being read from a storage device, data being written to a storage device, an I/O operation, etc.) within the queues will be sent to the second computing device instead of the first computing device that has failed.

When the first computing device is restored from the failure, a restoration process is performed. Upon the first computing device being restored, the first computing device determines that the second computing device now owns the first single port storage device. For example, when the second computing device performed the takeover, the second computing device may have updated drive ownership information stored in a scratchpad accessible to the first computing device and the second computing device to indicate that the second computing device now owns the first single port storage device and the second single port storage device. In an embodiment, a scratch pad may comprise scratch pad memory used to temporarily store data, such as device ownership data. The scratchpad memory may be accessible to the first computing device and the second computing device to store data and read data. The scratchpad memory may be located within the switch or other device (e.g., a computing device, a storage device, a cache, etc.).

The first computing device can read the scratchpad to determine that the second computing device now owns the first single port storage device. Accordingly, the first computing device transmits a request, such as through the mailbox registers as an interrupt (e.g., a register comprising bits that can be set to certain values to create an interrupt that is transmitted to the second computing device or to the first computing device), to the second computing device for permission to take back ownership of the first single port storage device. The second computing device may complete any pending transactions with the first single port storage device, and then will transmit a message to the first computing device giving the first computing device permission to take back ownership of the first single port storage device.

Upon receiving permission, a command is executed to reconfigure the first virtual switch and the second virtual switch back to the original configuration where the first computing device can use the first port and first virtual switch to access the first single port storage device through the second port. The second computing device will be able to use the third port and the second virtual switch to access the second single port storage device through the fourth port. The ownership data within the scratchpad is updated to indicate that the first computing device owns the first single port storage device and the second computing device owns the second single port storage device.

Accordingly, relatively low cost single port storage devices can be used to emulate dual port storage devices to provide redundancy, high availability takeover, and performance such as improved data throughput using multiple ports/paths that dual port storage devices provide. This is achieved by the configuration and reconfiguration of virtual switches within the switch.

To provide for dual port storage device emulation, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fibre Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that replay of metadata and data operations may be implemented within the clustered network environment 100. In an example, operations may be executed at node 116 and replayed at node 118. It may be appreciated that replay of metadata and data operations may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
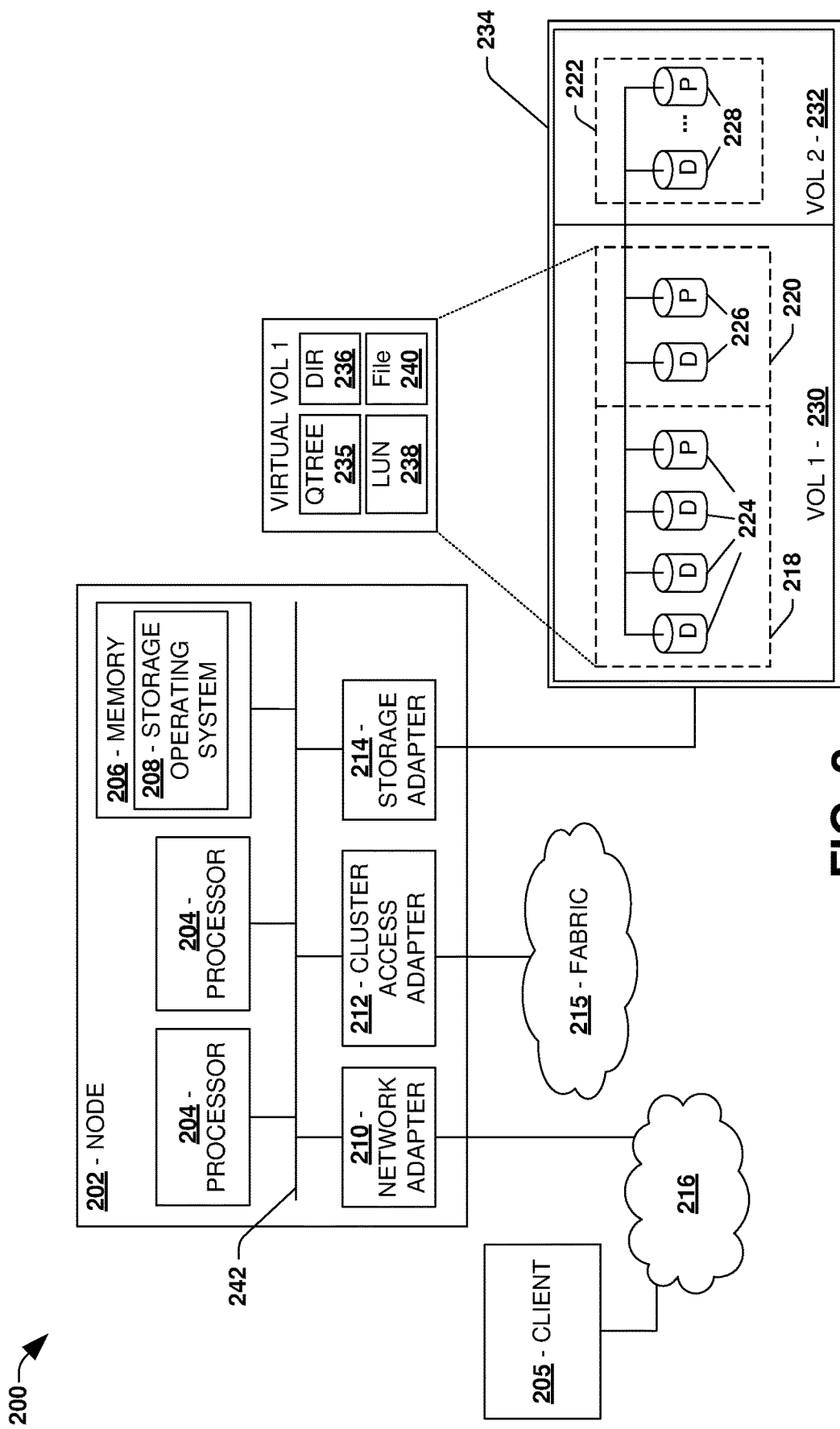
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that replay of metadata and data operations may be implemented for the data storage system 200. In an example, the node 202 may execute operation upon an NVRAM and replay the operations to flush the NVRAM to storage. It may be appreciated that replay of metadata and data operations may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
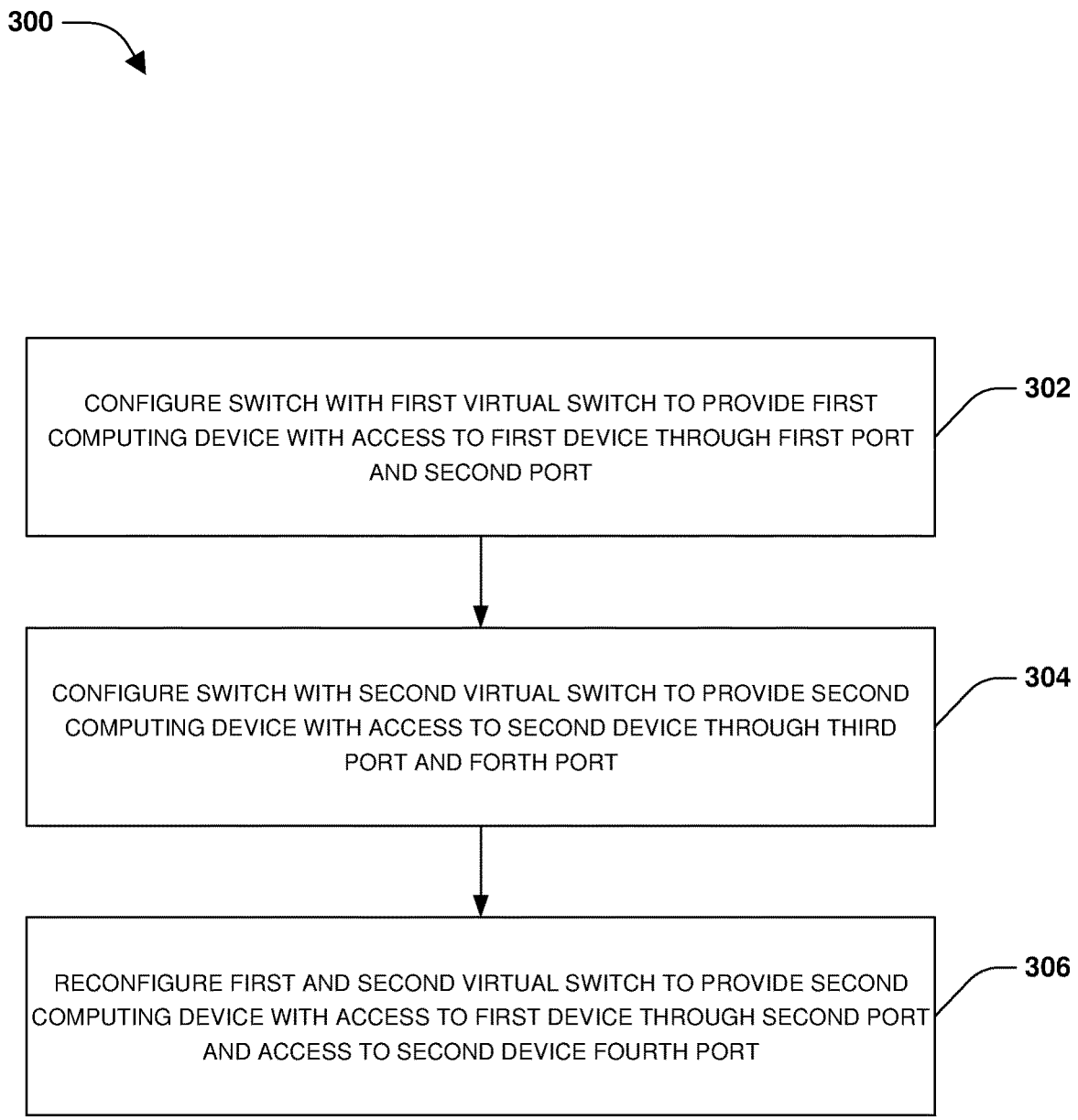
FIG. 3 is a flow chart illustrating an example method for dual port storage device emulation.
Figure 4A:
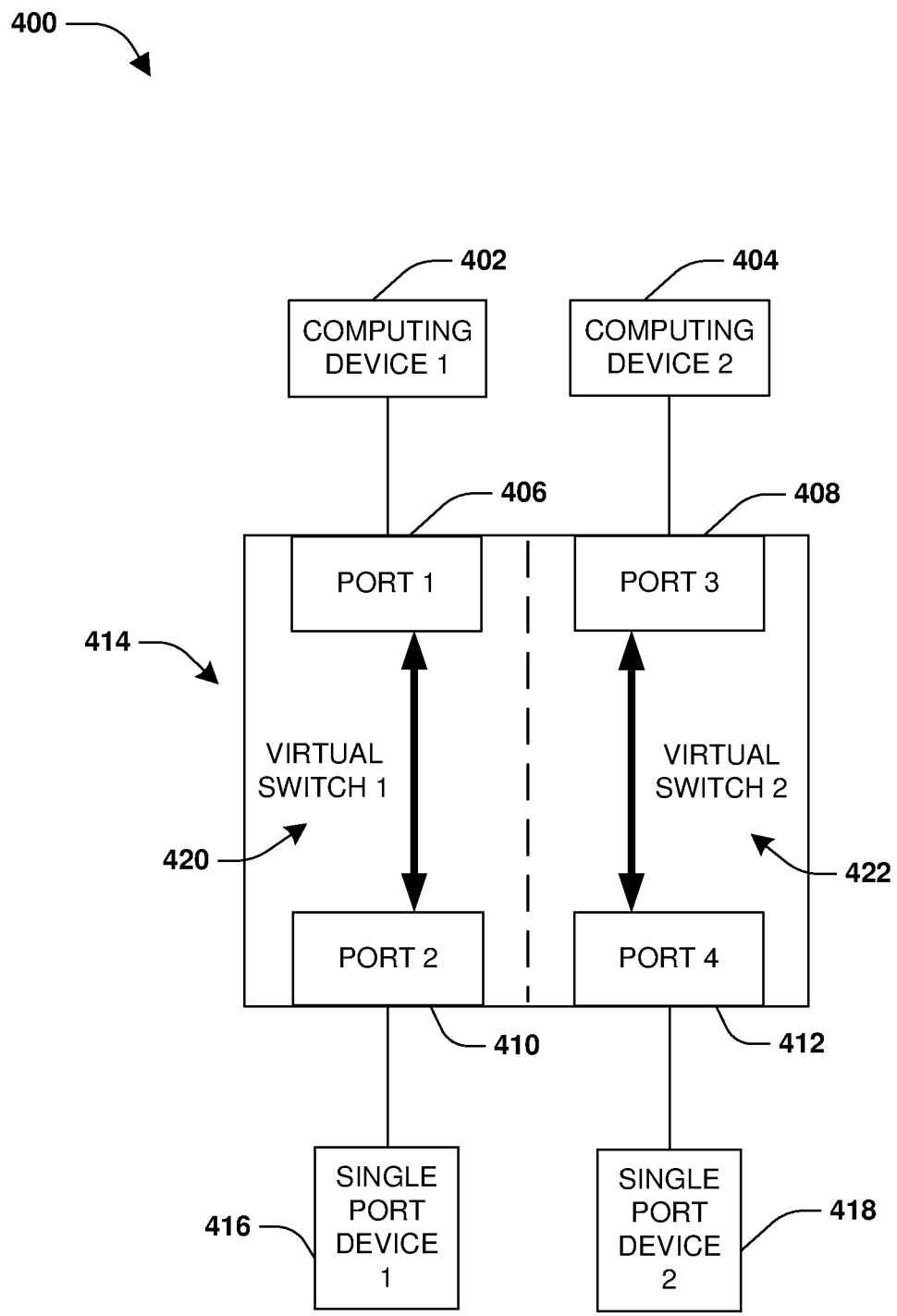
FIG. 4A is a component block diagram illustrating an example system for dual port storage device emulation.
Figure 4B:
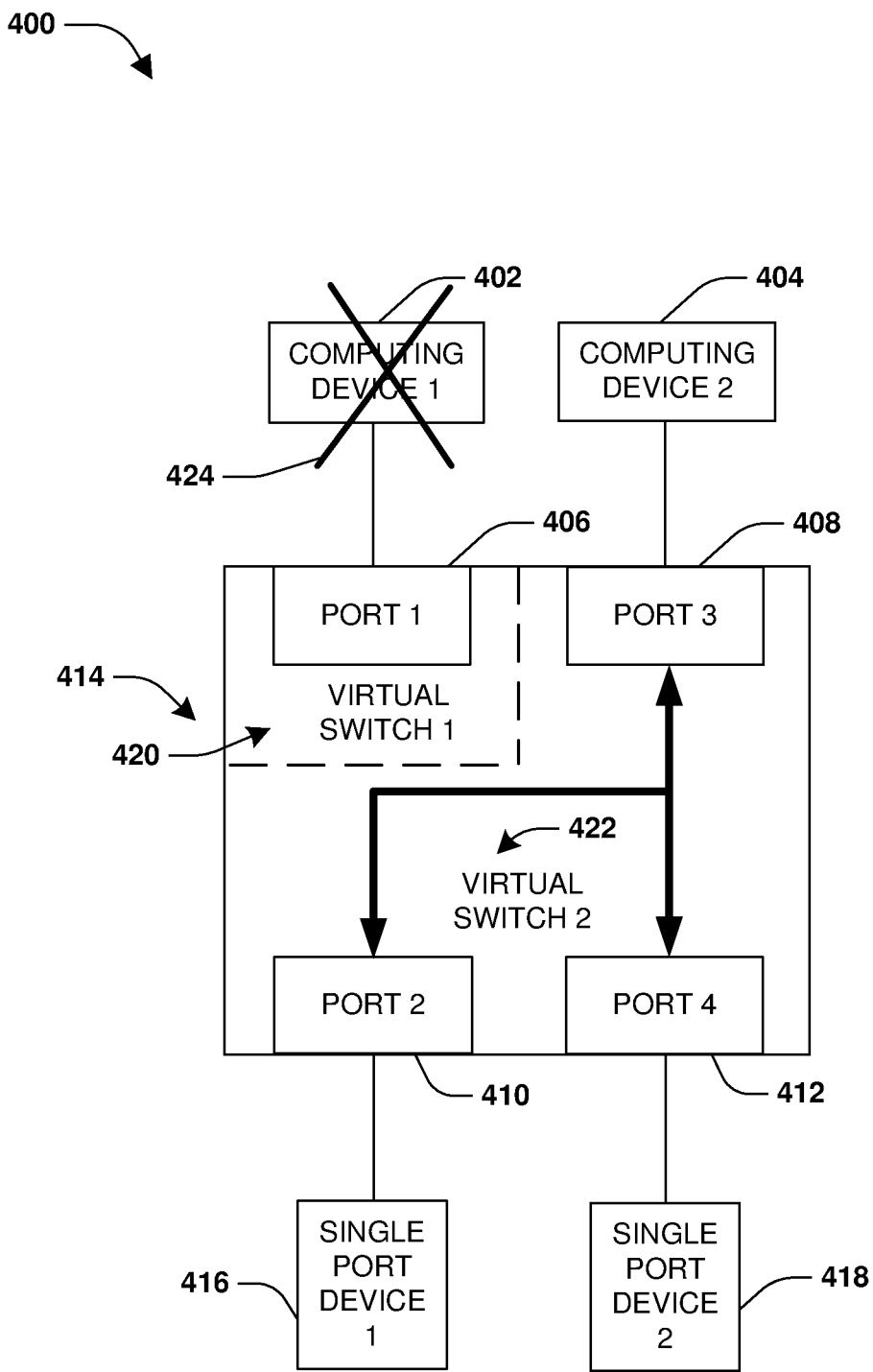
FIG. 4B is a component block diagram illustrating an example system for dual port storage device emulation during a failover.

One embodiment of emulating dual port storage devices is illustrated by an exemplary method 300 of FIG. 3 and further described in conjunction with system 400 of FIGS. 4A and 4B. At 302, a switch 414 is configured with a first virtual switch 420, as illustrated in FIG. 4A. The first virtual switch 420 is configured to provide a first computing device 402 (e.g., a first host configured to provide client devices with access to a first single port device 416 during normal operation) with access to the first single port device 416 through a first port 406 of the switch 414 connected to the first computing device 402 and a second port 410 of the switch 414 connected to the first single port device 416. The first single port device 416 may comprise a single port storage device comprising a single port for connectivity. Ownership data of the first single port device 416 being owned by the first computing device 402 is stored within a scratchpad storage area of the switch 414. The scratchpad storage area may comprise a memory accessible to the first computing device 402 and the second computing device 404.

At 304, the switch 414 is configured with a second virtual switch 422. The second virtual switch 422 is configured to provide a second computing device 404 (e.g., a second host configured to provide client devices with access to a second single port device 418 during normal operation) with access to the second single port device 418 through a third port 408 connected to the second computing device 404 and a fourth port 412 connected to the second single port device 418. The second single port device 418 may comprise a single port storage device comprising a single port for connectivity. Ownership data of the second single port device 418 being owned by the second computing device 404 is stored within the scratchpad storage area of the switch 414.

Various mechanisms can be used by the computing devices to detect whether the other computing device has failed. In one example, the second computing device 404 receives an interrupt from the first computing device 402. The interrupt indicates that the first computing device 402 is operational, such as whether the interrupt represents a heartbeat of the first computing device 402. The interrupt is generated based upon the first computing device 402 interacting with a register of the switch 414. For example, the first computing device 402 may set values within a mailbox register of the switch 414 using the first port 406 to create an interrupt that is transmitted to the second computing device 404 using the third port 408.

Based upon the configuration, the first virtual switch 420 listens for packets on the first port 406 (e.g., read and write operations transmitted by the first computing device 402 to the first port 406) and forwards those packets to the second port 410, for transmission to the first single port device 416, based upon the configuration of the first virtual switch 420. The first virtual switch 420 listens for packets on the second port 410 (e.g., data being read from the first single port device 416 or an operation complete message from the first single port device 416 that an operation was successfully completed by the first single port device 416) and forwards those packets to the first port 406, for transmission to the first computing device 402, based upon the configuration of the first virtual switch 420. A variety of other configurations can be applied to the first virtual switch 420 so that the first virtual switch 420 listens to select port(s) and forwards packets to other select port(s).

The second virtual switch 422 listens for packets on the third port 408 (e.g., read and write operations transmitted by the second computing device 404 to the third port 408) and forwards those packets to the fourth port 412, for transmission to the second single port device 418, based upon the configuration of the second virtual switch 422. The second virtual switch 422 listens for packets on the fourth port 412 (e.g., data being read from the second single port device 418 or an operation complete message from the second single port device 418 that an operation was successfully completed by the second single port device 418) and forwards those packets to the third port 408, for transmission to the second computing device 404, based upon the configuration of the second virtual switch 422. A variety of other configurations can be applied to the second virtual switch 422 so that the second virtual switch 422 listens to select port(s) and forwards packets to other select port(s).

In an embodiment, the second computing device 404 detects a failure 424 of the first computing device 402, as illustrated by FIG. 4B. The failure 424 may be detected based upon a loss of a heartbeat signal from the first computing device 402 (e.g., a threshold amount of time has passed since a last heartbeat signal was received). Upon detecting the failure 424 of the first computing device 402 such that the first computing device 402 is no longer able to provide client devices with access the first single port device 416, the second computing device 404 transmits a command through the third port 408 to the switch 414 to trigger a reconfiguration of the first virtual switch 420 and the second virtual switch 422. The reconfiguration is triggered so that the second computing device 404 will have access to both the first single port device 416 and the second single port device 418 through the second virtual switch 422 of the switch 414. In one example, the reconfiguration of the virtual switches is triggered based upon a timeout period expiring since a last interrupt was received. The expiration of the timeout period is indicative of the first computing device 402 failing 424. In another example, the reconfiguration is triggered based upon a link status interrupt being received. The link status interrupt indicates that communication between the first computing device 402 and the first port 406 has failed.

At 306, the first virtual switch 420 and the second virtual switch 422 are reconfigured to provide the second computing device 404 with access to the first single port device 416 through the third port 408 and the second port 410 and with access to the second single port device 418 through the third port 408 and the fourth port 412. The virtual switches are reconfigured to disconnect the first computing device 402 from accessing the first single port device 416 through the first virtual switch 420. This is accomplished by disconnecting the first virtual switch 420 from the second port 410.

In particular, the first virtual switch 420 is reconfigured to disconnect the first virtual switch 420 from the second port 410 connected to the first single port device 416. The first virtual switch 420 may be reconfigured to merely be connected to the first port 406 connected to the failed first computing device 402. Thus, the switch 414 can still receive communication from the first computing device 402, such as an indication that the first computing device 402 has recovered from the failure. In this way, the first virtual switch 420 will no longer route packets between the first port 406 and the second port 410, thus disconnecting the failed first computing device 402 from the first single port device 416.

The second virtual switch 422 is reconfigured to connect the second virtual switch 422 to the third port 408 connected to the second computing device 404, the second port 410 connected to the first single port device 416, and the fourth port 412 connected to the second single port device 418. The second virtual switch 422 is reconfigured to listen for packets on the third port 408, and forward packets targeting the first single port device 416 to the second port 410 for transmission to the first single port device 416 and forward packets targeting the second single port device 4118 to the fourth port 412 for transmission to the second single port device 418. The second virtual switch 422 is reconfigured to listen for packets on the second port 410 from the first single port device 416, and forward those packets to the third port 408 for transmission to the second computing device 404. The second virtual switch 422 is reconfigured to listen for packets on the fourth port 412 from the second single port device 418, and forward those packets to the third port 408 for transmission to the second computing device 404.

In an embodiment of reconfiguring the virtual switches, a configuration is applied to the first virtual switch 420 to disconnect the first virtual switch 420 from the second port 410. The first virtual switch 420 remains connected to the first port 406 so that communication from the first computing device 402 can be received. The configuration is applied to the second virtual switch 422 to connect the second virtual switch 422 to the second port 410, the third port 408, and the fourth port 412. A reset of the switch 414 is performed so that the virtual switches will operate according to the configuration applied thereto. The ownership data is updated by the second computing device 404 to indicate that the second computing device 404 now owns both the first single port device 416 and the second single port device 418.

In an embodiment of reconfiguring the virtual switches, a data queue of the first single port device 416 is deconstructed. The data queue was used to store data of the first single port device 416 that was destined for the first computing device 402. A new data queue is constructed for the first single port device 416. The new data queue points to the second computing device 404 for queuing data that will now be sent to the second computing device 404.

In an embodiment of reconfiguring the virtual switches, an administration queue of the first single port device 416 is deconstructed. The administration queue was used to store administration commands communicated between the first computing device 402 and the first single port device 416. A new administration queue is constructed for the first single port device 416. The new administration queue points to the second computing device 404 for queuing administration commands that will be communicated between the first single port device 416 and the second computing device 404.

In an embodiment, the first computing device 402 recovers from the failure. The first computing device 402 may transmit a request to reacquire ownership of the first single port device 416 from the second computing device 404. The request may be transmitted by the first computing device 402 to the first port 406 so that the first virtual switch 420 can process the request so that the second computing device 404 receives notification of the request. The second computing device 404 may implement a restoration process based upon receiving the request from the first computing device 402 to restore ownership of the first single port device 416 back to the first computing device 402. The restoration process reconfigures the first virtual switch 420 to provide the first computing device 402 with access to the first single port device 416 through the first port 406 and the second port 410. The first virtual switch 420 is reconfigured to connect the first virtual switch 420 to the first port 406 and the second port 410 for routing packets (e.g., data, I/O operations, etc.) between the first port 406 and the second port 410 to facilitate communication between the first computing device 402 and the first single port device 416. It may be appreciated that this reconfiguration due to the restoration process is illustrated by FIG. 4A.

The restoration process reconfigures the second virtual switch 422 to provide the second computing device 404 with access to the second single port device 418 through the third port 408 and the fourth port 412, and to disconnect the second computing device 404 from having access to the first single port device 416. The second virtual switch 422 is reconfigured to connect the second virtual switch 422 to the third port 408 and the fourth port 412 for routing packets (e.g., data, I/O operations, etc.) between the third port 408 and the fourth port 412 to facilitate communication between the second computing device 404 and the second single port device 418. It may be appreciated that this reconfiguration due to the restoration process is illustrated by FIG. 4A. Ownership data within the scratchpad storage area of the switch 414 is updated to indicate that the first computing device 402 owns the first single port device 416 and that the second computing device 404 owns the second single port device 418.

Figure 5:
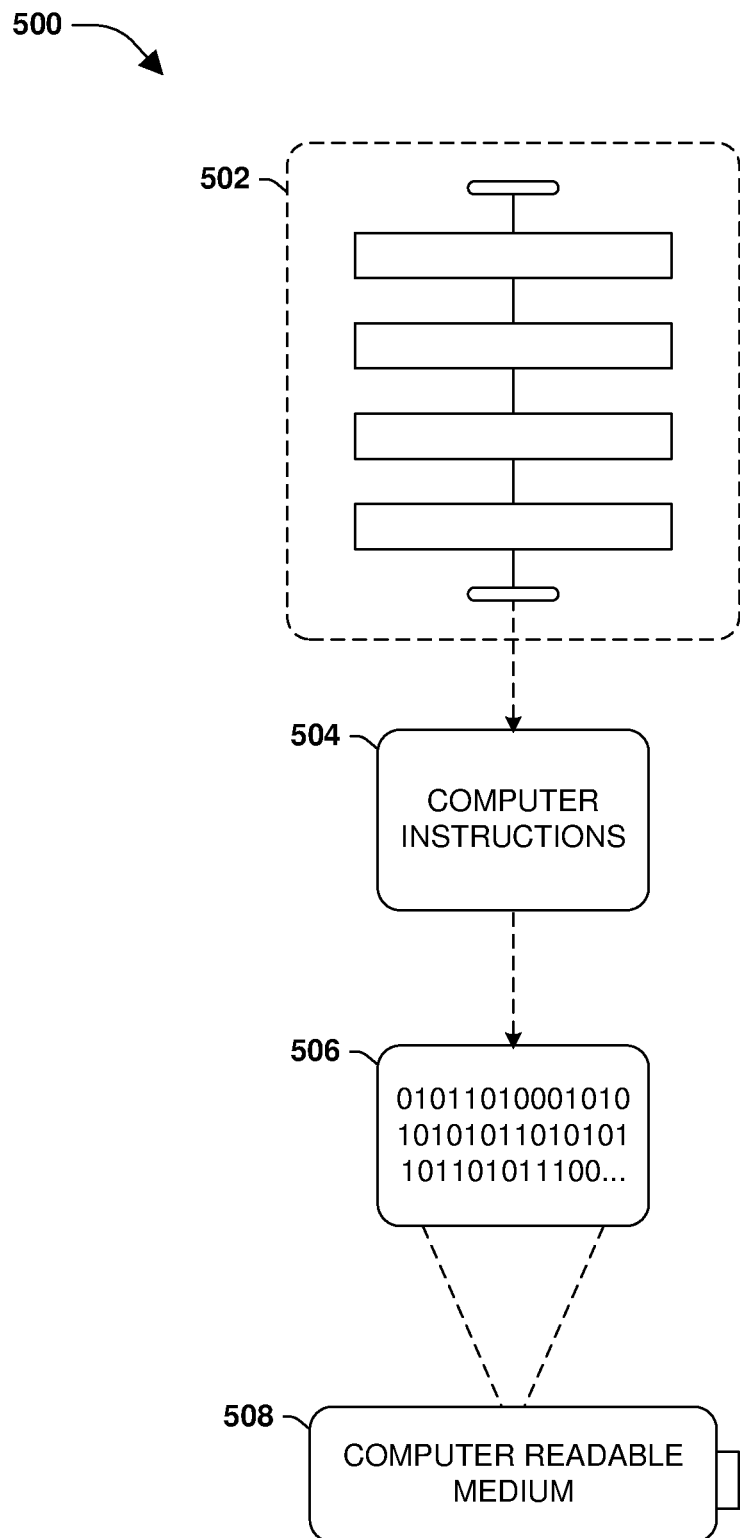
FIG. 5 is an example of a computer readable medium in which an embodiment of the invention may be implemented.

Still another embodiment 500 involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A and 4D, for example. Many such computer-readable media are contemplated to operate in accordance with the techniques presented herein.

Figure 6:
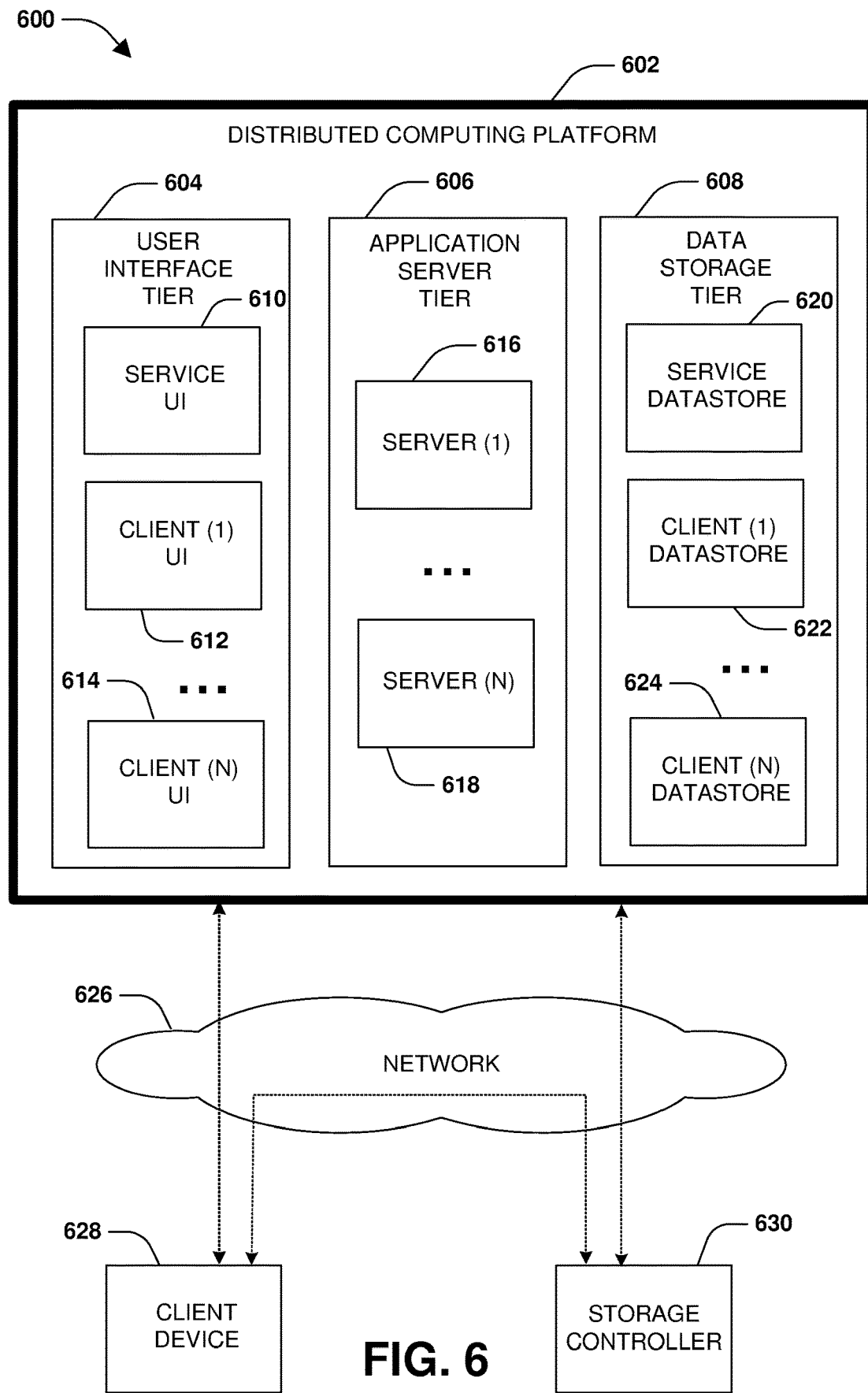
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SMVs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
utilizing a first virtual switch of a switch to provide a first computing device with access to a first storage device through a first port connected to the first computing device and a second port connected to the first storage device, wherein the first storage device comprises a single port;
utilizing a second virtual switch of the switch to provide a second computing device with access to a second storage device through a third port connected to the second computing device and a fourth port connected to the second storage device, wherein the second storage device comprises a single port; and
modifying the first virtual switch and the second virtual switch to provide the second computing device with access to the first storage device through the second port and to the second storage device through the fourth port and disconnect the first computing device from accessing the first storage device through the first virtual switch based upon the first computing device experiencing a failure.

2. The method of claim 1, comprising:
storing ownership data of the first storage device and the second storage device within a scratchpad storage area of the switch.

3. The method of claim 2, comprising:
updating the ownership data to indicate that the second computing device has ownership of the first storage device based upon the modification of the first virtual switch and the second virtual switch.

4. The method of claim 1, comprising:
performing a restoration process based upon receiving a request from the first computing device to restore ownership of the first storage device back to the first computing device that has recovered from the failure, wherein the restoration process modifies the first virtual switch to provide the first computing device with access to the first storage device and the second virtual switch to provide the second computing device with access to the second storage device and disconnect the second computing device from having access to the first storage device.

5. The method of claim 4, wherein the performing the restoration process comprises:
updating ownership data within a scratchpad storage area of the switch to indicate that the first computing device owns the first storage device and the second computing device owns the second storage device.

6. The method of claim 1, wherein the modifying comprises:
deconstructing a data queue of the first storage device, wherein data that is to be sent to the first computing device is stored within the data queue.

7. The method of claim 6, comprising:
constructing a new data queue for the first storage device, wherein the new data queue points to the second computing device for queueing data that will be sent to the second computing device.

8. The method of claim 1, wherein the modifying comprises:
deconstructing an administration queue of the first storage device, wherein administration commands communicated between the first storage device and the first computing device are stored within the administration queue.

9. The method of claim 8, comprising:
constructing a new administration queue for the first single port device, wherein the new administration queue points to the second computing device for queueing administration commands to communicate between the first storage device and the second computing device.

10. The method of claim 1, wherein the modifying comprises:
applying a configuration to the first virtual switch to disconnect the first virtual switch from the second port.

11. The method of claim 10, comprising:
performing a reset to the switch so that the first virtual switch operates based upon the configuration.

12. The method of claim 1, wherein the modifying comprises:
apply a configuration to the second virtual switch to connect the second virtual switch to the second port, the third port, and the fourth port.

13. The method of claim 12, comprising:
performing a reset to the switch so that the second virtual switch operates based upon the configuration.

14. The method of claim 1, wherein the first storage device is connected to the second port and the second storage device is connected to the fourth port.

15. The method of claim 1, comprising:
receiving, by the second computing device, an interrupt indicating that the first computing device is operational, wherein the interrupt is generated based upon the first computing device interacting with a register of the switch.

16. The method of claim 15, comprising:
triggering the modification of the first virtual switch and the second virtual switch based upon a timeout period expiring since a last interrupt was received, wherein the expiration of the timeout period is indicative of the first computing device failing.

17. The method of claim 15, comprising:
triggering the modification of the first virtual switch and the second virtual switch based upon receiving a link status interrupt indicating that a communication link between the first computing device and the first port has failed.

18. A non-transitory machine readable medium comprising instructions for performing a method, which when executed by a machine, causes the machine to:
utilize a first virtual switch of a switch to provide a first computing device with access to a first storage device through a first port connected to the first computing device and a second port connected to the first storage device, wherein the first storage device comprises a single port;
utilize a second virtual switch of the switch to provide a second computing device with access to a second storage device through a third port connected to the second computing device and a fourth port connected to the second storage device, wherein the second storage device comprises a single port; and
modify the first virtual switch and the second virtual switch to provide the second computing device with access to the first storage device through the second port and to the second storage device through the fourth port and disconnect the first computing device from accessing the first storage device through the first virtual switch based upon the first computing device experiencing a failure.

19. The non-transitory machine readable medium of claim 18, wherein the instructions cause the machine to:
store ownership data of the first storage device and the second storage device within a scratchpad storage area of the switch.

20. A device configured to:
utilize a first virtual switch of a switch to provide a first computing device with access to a first storage device through a first port connected to the first computing device and a second port connected to the first storage device, wherein the first storage device comprises a single port;
utilize a second virtual switch of the switch to provide a second computing device with access to a second storage device through a third port connected to the second computing device and a fourth port connected to the second storage device, wherein the second storage device comprises a single port; and
modify the first virtual switch and the second virtual switch to provide the second computing device with access to the first storage device through the second port and to the second storage device through the fourth port and disconnect the first computing device from accessing the first storage device through the first virtual switch based upon the first computing device experiencing a failure.

* * * * *